United States Patent
Suominen et al.

(10) Patent No.: US 11,449,610 B2
(45) Date of Patent: Sep. 20, 2022

(54) THREAT DETECTION SYSTEM

(71) Applicant: F-Secure Corporation, Helsinki (FI)

(72) Inventors: Mikko Suominen, Helsinki (FI); Dmitriy Komashinskiy, Espoo (FI); Fredrik Kock, Kirkkonummi (FI)

(73) Assignee: Withsecure Corporation, Helsinki (FI)

( * ) Notice: Subject to any disclaimer, the term of this patent is extended or adjusted under 35 U.S.C. 154(b) by 466 days.

(21) Appl. No.: 16/356,431

(22) Filed: Mar. 18, 2019

(65) Prior Publication Data

US 2019/0294795 A1  Sep. 26, 2019

(30) Foreign Application Priority Data

Mar. 20, 2018  (GB) ..................................... 1804396

(51) Int. Cl.
*G06F 21/56* (2013.01)
*G06F 8/61* (2018.01)

(52) U.S. Cl.
CPC .............. *G06F 21/566* (2013.01); *G06F 8/61* (2013.01); *G06F 2221/034* (2013.01)

(58) Field of Classification Search
CPC ..... G06F 21/566; G06F 8/61; G06F 2221/034
See application file for complete search history.

(56) References Cited

U.S. PATENT DOCUMENTS

| | | | |
|---|---|---|---|
| 9,117,079 B1* | 8/2015 | Huang | G06F 9/44505 |
| 9,626,509 B1* | 4/2017 | Khalid | G06F 21/566 |
| 10,025,927 B1* | 7/2018 | Khalid | G06F 21/556 |
| 2014/0366140 A1 | 12/2014 | Chen et al. | 726/25 |
| 2016/0285914 A1* | 9/2016 | Singh | G06F 21/00 |
| 2016/0300065 A1 | 10/2016 | Bang | |
| 2017/0161499 A1 | 6/2017 | Hentunen | |

FOREIGN PATENT DOCUMENTS

CN          107967208 B  *  1/2020  .......... G06F 11/3668

* cited by examiner

*Primary Examiner* — Matthew Smithers
*Assistant Examiner* — Shu Chun Gao
(74) *Attorney, Agent, or Firm* — Harrington & Smith

(57) ABSTRACT

There is provided a method of detecting a threat against a computer system. The method includes monitoring installation and operation of multiple different versions of the same application in a computer system; analysing evolutionary changes between the behaviours of the different versions of the same application; detecting and monitoring a new version of the same application in a computer system; monitoring the behavior of the computer system to detect one or more procedures of the monitored application that do not match expected behaviors of the monitored application on the basis of the analysis; and upon detection of one or more procedures not matching the expected behaviors of the monitored application, identifying the monitored application as malicious or suspicious.

21 Claims, 3 Drawing Sheets

---

200 Monitor installation and operation of multiple different versions of same application in computer system 201 Analyse evolutionary changes between behaviours of different versions of same application 202 Detect and monitor new version of the same application in the computer system 203 Monitor behaviour of computer system to detect any procedures not matching expected behaviours 204 Identify application as malicious/suspicious upon detecting procedure not matching the expected behaviours of application

THREAT DETECTION SYSTEM

FIELD OF THE INVENTION

The present invention relates to detecting a threat against a computer system.

BACKGROUND

The term "malware" is short for malicious software and is used to refer to any software designed to infiltrate or damage a computer system without the owner's informed consent. Malware can include viruses, worms, Trojan horses, rootkits, adware, spyware and any other malicious and unwanted software. Many computer devices and computer systems, such as desktop personal computers (PCs), laptops, personal data assistants (PDAs) and mobile phones can be at risk from malware.

Advanced attacks targeting organizations have become mainstream and cover commercial, governmental and private organizations. The factions performing these kind of attacks have tremendous resources and may use highly advanced methods to breach their targets. One example of such advanced methods is a so called supply chain attack where attackers breach an organization not by directly attacking the actual target but by compromising the products of $3^{rd}$ party software developers which are used by the target organization. Once the attackers have gained sufficient access to the software developer's network, they may modify the software at some pre-release stage to suit their needs. As the software developer releases the compromised version of the software, the attackers gain access to any organization using that software.

In order to avoid false alarms and improve performance, security applications typically consider software coming from known vendors as clean by default when they are signed with a normal code signing certificate for the vendor. Organizations also many times implicitly trust their selected software vendors and as a result of this the software may be widely distributed within the organization without vetting the software more closely. Thus, the software that has been modified to include malicious code, for example during the development process of it, is unlikely to get detected as malicious by a security software or other mechanisms.

There is a need for methods and systems that alleviate the foregoing problems and enable detecting malicious modifications in software applications before these applications cause harm to computer systems.

SUMMARY

"Various aspects of examples of the invention are set out in the claims.

According to an aspect of the invention, there is provided a method as specified in the application.

According to an aspect of the invention, there is provided a computer system as specified in the application.

According to an aspect of the invention there is provided computer program comprising computer readable code as specified in the application.

According to an aspect of the invention there is provided a non-transitory computer storage medium as specified in the application.

Embodiments of the invention are defined in the application."

DETAILED DESCRIPTION

In order to provide improved detection of malware and threats, a system is proposed which makes use of behaviour profiles generated for multiple different versions of the same application in a computer system. For example malicious modifications done to software before its release (i.e. any time during the development and build process) may be detected by comparing behavioural data of multiple different versions of the same software to deduce what changes in the behaviour are likely to be part of normal evolutionary progress and which changes have been caused by abnormal, malicious or suspicious modifications.

The proposed solution has many benefits, such as providing early detection and stopping execution prior to malicious actions, and understanding the lineage of the threat in an automated manner providing significant benefits to threat intelligence through providing detailed information.

The proposed solution may be implemented with a system that analyses behavioural data produced by executing multiple versions of the same software. When a new version of the software is released, the behavioural data produced by it is compared against the evolution in behaviour that has been seen in earlier versions of the same software. If the changes in behaviour of the new version are different to those expected based on analysis of the changes in data from earlier versions, then the new version may contain anomalous changes and the system may generate an alert. Analysis results for each new version can be stored in a database for future use.

The required behavioural data can be generated by executing the software on physical machines during normal usage, on separate test machines for the sole purpose of generating the required data or by any type of virtualization solution. The tool(s) used to extract behavioural data may be any suitable tool such as an Endpoint Detection & Response (EDR) product, a public tracing tool or a custom tool made specifically for the purpose.

In an embodiment, the decision when to detect a version of a software as containing malicious/suspicious changes may involve specific predetermined rules (e.g. a network connection to a destination the software has previously not connected to), a machine learning approach or any other decision making logic that uses the behavioural data as input.

In an embodiment, the difference in version numbers may be used at least as part of the detection logic: with a small change between version numbers a small change in behaviour is expected, a major change between version numbers means a greater change in behaviour may be considered normal.

Figure 1:
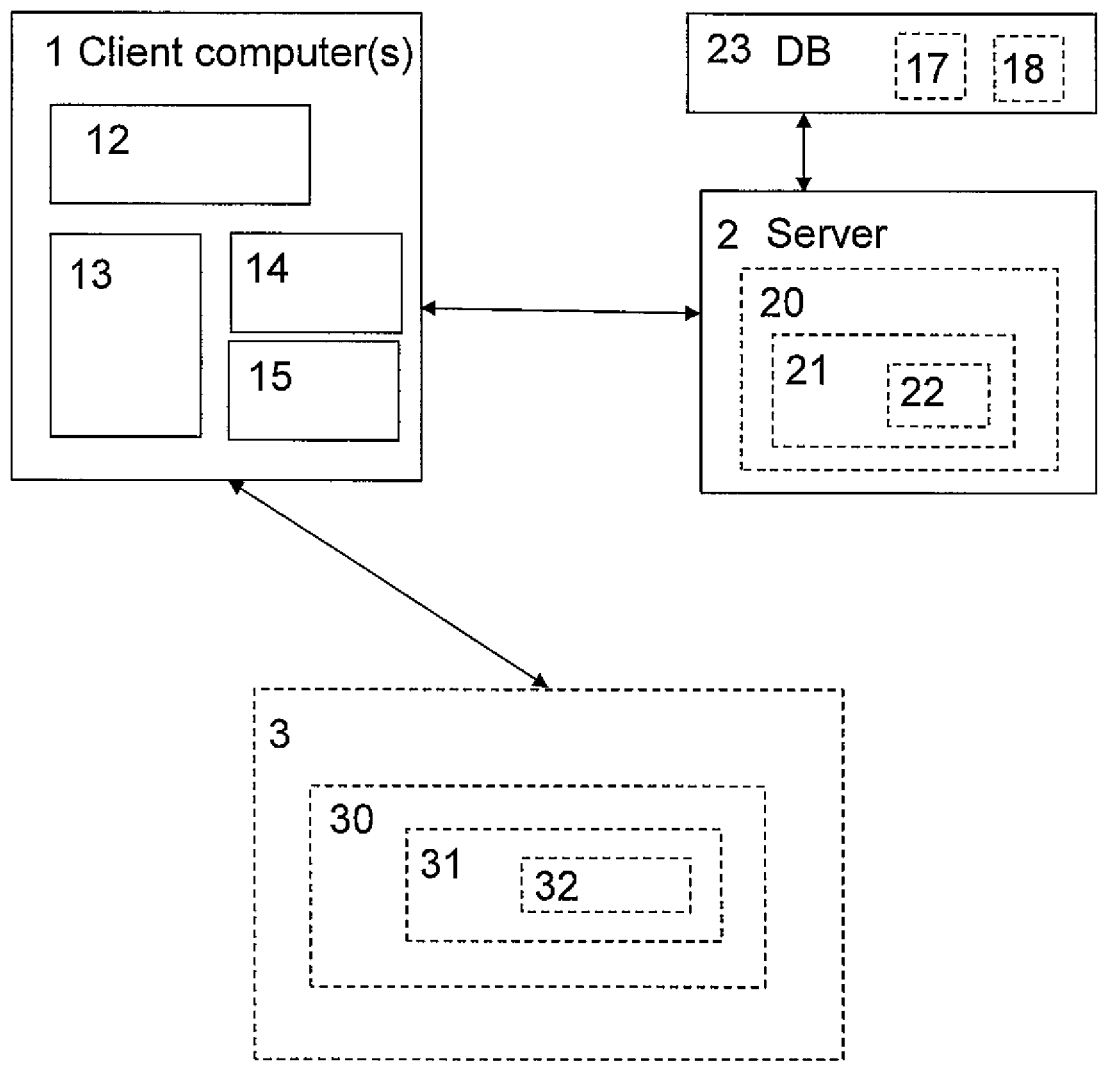
FIG. 1 is a schematic diagram of a system.

An example schematic diagram of a system according to the invention will be described with reference to FIG. 1. A client computer 1 has installed thereon a security application 14 provided by a security service provider. The computer runs a number of further applications, and the security application 14 monitors actions taken by those further applications. The client computer 1 may connect to a server 2, and the security application 14 sends results of the monitoring to the server 2 for analysis, or the analysis may be performed at the client computer 1 by the security application. Data 17 relating to applications or services may be stored in a database 23. Application behaviour profiles/representations of behaviours 18 of applications/services may be constructed at the client 1 by the security application 14, at the server 2, and/or at a second server 3 and be stored in a database 23. The client computer 1 and the servers 2 and 3 each typically comprise a hard drive 12, 20, 30, a processor 13, 21, 31, and RAM 15, 22, 32. The client computer 1 may connect to the servers 2 and 3 over the Internet, or any suitable network. The servers 2 and 3 (if used) are operated by the security service provider.

Figure 2:
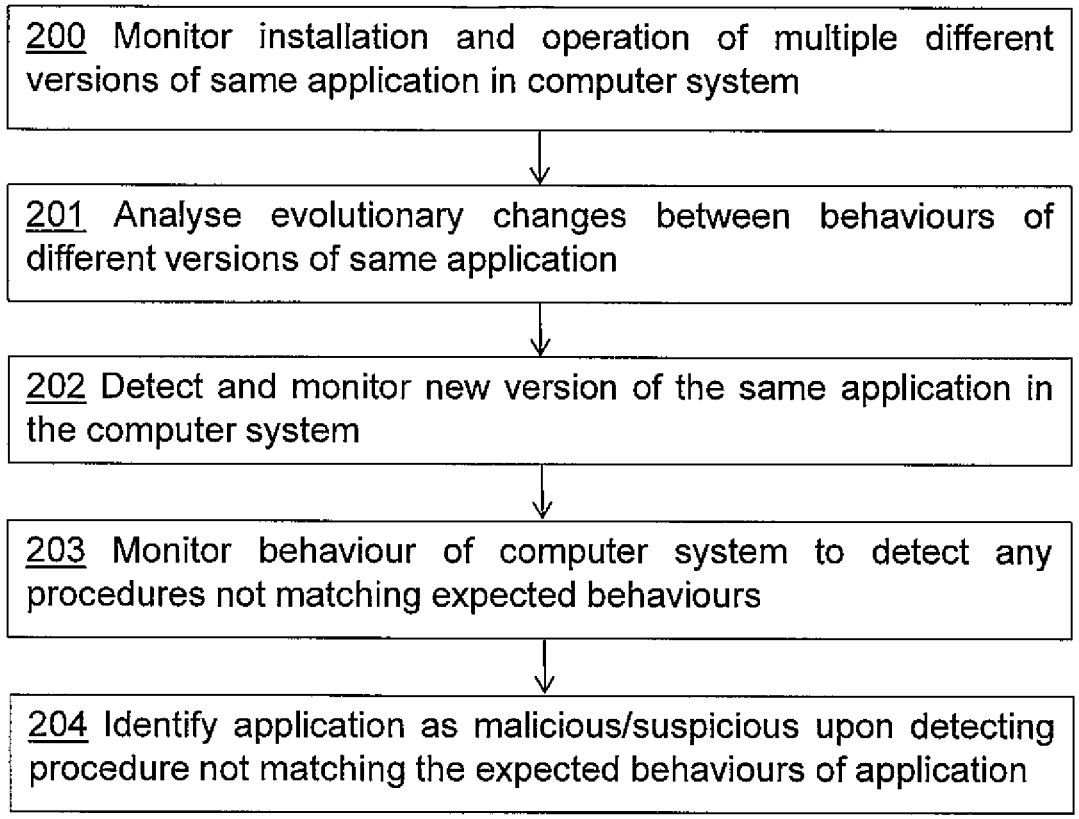
FIG. 2 is a flowchart of a malware protection method according to an embodiment.

FIG. 2 is a flowchart of a method of detecting malware according to an embodiment.

In 200, the security application analyses the computer system 1 to monitor installation and operation of multiple different versions of the same application in a computer system.

In 201, the security application analyses evolutionary changes between the behaviours of the different versions of the same application. In an embodiment, the security application may create and store representations of the behaviour of the applications on the basis of the analysis. In an embodiment, the representations may be created based on sub-components of the monitored applications. Each sub-component identifies one or more procedures known to be performed by the applications. For each such application, the security application may also maintain identification information for the application such as filenames, hash data, certificates, etc. The security application may further maintain a behaviour profile for each of the monitored applications. The behaviour profile for an application identifies how the application implements one or more procedures, for example how an SSL or other secure connection is established, how the application edits registry entries, or any other operation such as file access, network access or memory related operations. The profile identifies, for each procedure, a characteristic action (which will typically be the action which is the result of the procedure) and one or more expected actions. For example, in the case of an SSL connection, the characteristic action may be the sending of an SSL encrypted message, and the expected actions may include a call to a library which provides an SSL implementation.

As a further example, the characteristic action may be the editing of a registry entry. The API used to perform this action will generally be the same regardless of implementation, but there is a detectable difference in the actions preceding the registry edit depending on the programming language in which the code is written, and possibly on the compiler used. The actions may be anything which is done by the application or other software or hardware on the computer system as part of the procedure. The procedures may include file, registry, memory, and/or network operations.

In 202, the security application detects and monitors a new version of the same application in a computer system.

In 203, the security application monitors behavior of the computer system to detect one or more procedures of the monitored new version of the same application that do not match expected behaviors of the monitored application on the basis of the analysis. In an embodiment, the security application monitors the behaviour (e.g. one or more procedures) of the monitored application and compares the detected behaviour with the representation of expected behaviour of the same application that has been stored in the database.

In 204, upon detection of one or more procedures not matching the expected behaviors of the monitored application, the monitored application is identified as malicious or suspicious.

Figure 3:
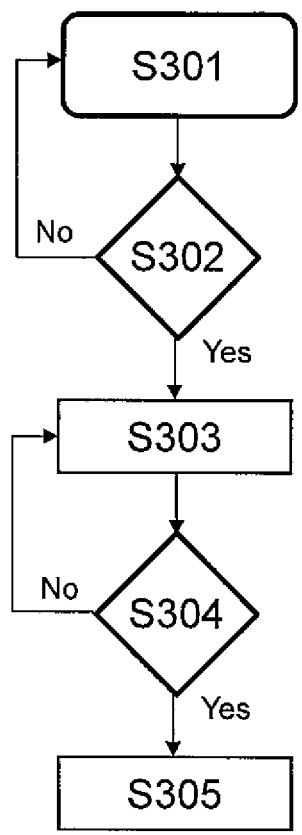
FIG. 3 is a schematic diagram of a procedure according to exemplary embodiment of the present invention.

FIG. 3 is a schematic diagram of a procedure according to exemplary embodiment of the present invention.

In S301, installation and operation of multiple versions of the same application and evolutionary changes between the behaviours of the versions are monitored and analysed in a computer system. If, in S302, a new version of the same application is detected, then S303 is entered. In S303, the behaviour of the computer system is monitored to detect any procedures of the monitored new version of the same application that do not match expected behaviours of the monitored application. If, in S304, one or more procedures not matching the expected behaviours of the monitored application is detected, then S305 is entered where the monitored application is identified as malicious or suspicious.

In an embodiment, the step of analyzing evolutionary changes of the behaviours may comprise analyzing evolutionary changes of the behaviours of subsequent versions of the same application.

In an embodiment, the representations of expected behaviours of the monitored application are created and stored in a database on the basis of the analysis. The behavior of the monitored application may thus be compared to the stored representations of the expected behaviours to detect one or more procedures not matching the expected behaviours of the monitored application.

In an embodiment, the behavioural data for the analysis may be generated by executing multiple different versions of the same application on physical machines during normal usage, on separate test machines or by any virtualization system.

In an embodiment, the detected procedures may include any one or more of: establishment of a secure session, communication over a secure session, file operations, registry operations, memory operations, network operations.

In an embodiment, the step of identifying the monitored application as malicious or suspicious may be based on at least one of: fulfilling predetermined rules, machine learning approach used, a decision making logic using the behavioural data as input.

In an embodiment, the step of identifying the monitored application as malicious or suspicious may be based on the detected difference between the version numbers of the different versions of the same application. For example, the expected amount of change in behavior may be related to the amount of change in version numbers.

In an embodiment, the step of identifying the monitored application as malicious or suspicious may further comprise first determining which already analysed version of the same application is most similar with the new version of the same application by comparing the codes of the different versions of the same application with the code of the new version of the same application. Then a version delta value between the most similar version and the new version is determined based on the comparison. Finally, the monitored application may be identified as suspicious or malicious if the version delta value is subtle and the behavioural difference is substantial. Further, the monitored application may be identified as unknown if the version delta value is substantial and the behavioural difference is substantial. The monitored application may be identified as normal if both the version delta value and the behavioural difference is subtle or the version delta value is substantial and the behavioural difference is subtle.

In an embodiment, the version delta value may be determined to be subtle when a predetermined first threshold value is not exceeded and substantial when the predetermined first threshold value is exceeded. In an embodiment, the behavioural difference may be determined to be subtle when a predetermined second threshold value is not exceeded and substantial when the predetermined second threshold value is exceeded.

In an embodiment, a security application may provide a warning about the monitored application being identified as malicious or suspicious. Installation and operation of the different versions of the same application may be stored in the database and monitored to get "a baseline" of known expected behaviour of them. The security application may create and store representations of the expected behaviours of the applications on the basis of the monitoring.

In an embodiment, each procedure of the one or more procedures of the monitored applications may be identified by a characteristic action and one or more expected actions. The characteristic and/or expected actions may include one or more of: API calls and/or API call parameters made by the running application, information made available to plugins of the running application, actions relating to browser extensions, file access operations performed by the running application, network operations performed by the running application, encrypted communications sent by the running application, error conditions relating to the running application. In an embodiment, the procedures may include any one or more of: establishment of a secure session, communication over a secure session, file operations, registry operations, memory operations, network operations.

In an embodiment, upon identifying the monitored application as malicious or suspicious, the application may be handled by one or more of: terminating a process of the application, terminating the characteristic action or an action resulting from the characteristic action, removing or otherwise making safe the application and performing a further malware scan on the application. In an embodiment, upon identifying the application as malicious or suspicious, the method further comprises at least one of: sending from a client computer to a server details of the characteristic action and other actions taken on the client computer; sending from the server to client computer an indication as to whether or not the application is malicious or suspicious; sending from the server to the client computer instructions for handling the application; prompting the client computer to kill and/or remove the application; storing information indicating the application. In an embodiment, an alert may be triggered when detecting any operations on said application that do not match "the baseline".

The method steps according to the invention may be created on the "back end", i.e. by a security service provider and provided to the security application at the client computer. A set of characteristic actions relating to suitable procedures, performed by an application, may be specified and the application then analysed to determine characteristic and expected actions. The analysis may also include receiving behavioural monitoring information from each of a plurality of client computers on which the application has been running, and determining the characteristic and expected actions from the aggregated results of the behavioural monitoring.

Alternatively, at least part of the method steps may be performed at the client computer. The behaviour of the applications may be monitored during normal use of the computer. In order to mitigate the risks of creating the profile at the client computer, the application may be subject to intensive behavioural analysis techniques while the representation of the expected behaviour of the application is being created.

As a further alternative, a behaviour profile may be created either at the client computer or the server by examining the binary code of the application. The code is examined to look for characteristic actions of interest, and to determine which expected actions would be associated with those characteristic actions.

Prior to performing any of the above analyses, the application may be identified as a known malware by comparing it to identification information of the malware. For example, the application may be compared to a hash of a known malicious application, or a digital signature of the application may be examined to determine whether it is valid or issued by a trusted source.

The behaviour monitoring and detection of characteristic and expected actions may be performed at the client computer or at the server. Alternatively, the client computer may monitor the behaviour of the suspect application, and send details of monitored actions to a server, along with identification information for the monitored application. The information may be sent periodically, or only when characteristic actions are detected (e.g. detecting an SSL connection may cause the client computer to send details of the behaviour leading up to the SSL connection to the server). The server maintains the database of the applications to be monitored, and detects characteristic actions (if not already detected by the client), and the expected action. The detection is carried out as described above. If the analysis identifies the application running on the client computer as malicious or suspicious, then the server notifies the client computer, and may specify a response to be performed.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of detecting a threat against a computer system arising from malicious modification introduced to a version of an application, the method comprising:
   a) monitoring installation and operation of multiple different versions of an application in the computer system;
   b) analysing the multiple different versions of the monitored application
   c) to generate behavioral data that is descriptive of evolutionary changes between behaviours of the multiple different versions of the monitored application;
   d) detecting and monitoring a new version of the monitored application in the computer system;
   e) monitoring behavior of the computer system to detect one or more procedures of the new version of the monitored application that do not match expected behaviors of the new version of the monitored application on a basis of the behavioural data generated via said analysis; and upon detection of the one or more procedures not matching the expected behaviors of the new version of monitored application, identifying the new version of the monitored application as malicious or suspicious.

2. The method according to claim 1, wherein analysing the evolutionary changes of the behaviours comprises analysing evolutionary changes of the behaviours of subsequent versions of the monitored application.

3. The method according to claim 1, the method further comprising creating and storing representations of the expected behaviors of the new version of monitored application on the basis of the analysis.

4. The method according to claim 1, wherein the step of detecting one or more procedures that do not match the expected behaviours of the new version of the monitored application further comprises comparing the behaviour of the new version of the monitored application to stored representations of expected behaviours.

5. The method according to claim 1, the method further comprising generating behavioural data for the analysis by executing multiple different versions of the monitored application on physical machines during normal usage, on separate test machines or by a virtualization system.

6. The method according to claim 1, wherein each procedure of the one or more procedures of the new version of the monitored application is identified by a characteristic action and one or more expected actions.

7. The method according to claim 6, wherein at least one of the characteristic or expected actions include one or more of:

API calls and/or API call parameters made by a running application, information made available to plugins of the running application, actions relating to browser extensions, file access operations performed by the running application, network operations performed by the naming application, encrypted communications sent by the running application, error conditions relating to the running application.

8. The method according to claim 1, wherein said procedures include any one or more of:
establishment of a secure session,
communication over a secure session,
file operations,
registry operations,
memory operations, or
network operations.

9. The method according to claim 1, wherein the step of identifying the new version of the monitored application as malicious or suspicious is based on at least one of:
fulfilling predetermined rules,
machine learning approach used, or
a decision making logic using the behavioural data as input.

10. The method according to claim 1, wherein the step of identifying the new version of the monitored application as malicious or suspicious is further based on a difference in version numbers of the multiple different versions of the monitored application, wherein an expected amount of change in behaviour is related to an amount of change in version numbers.

11. The method according to claim 1, wherein the step of identifying the new version of the monitored application as malicious or suspicious further comprises:

determining which already analysed version of the application is most similar with the new version of the application by comparing codes of the multiple different versions of the monitored application with the new version of the application;

determining a version delta value between the most similar version and the new version on the basis of the comparison comprising at least one of;

identifying the new version of the monitored application as suspicious or malicious, if the version delta value is subtle and a behavioural difference is substantial;

identifying the new version of the monitored application as unknown, if the version delta value is substantial and the behavioural difference is substantial; or identifying the new version of the monitored application as normal, if both the version delta value and the behavioural difference is subtle or the version delta value is substantial and the behavioural difference is subtle.

12. The method according to claim 11, wherein the version delta value is determined to be subtle when a predetermined first threshold value is not exceeded and substantial when the predetermined first threshold value is exceeded, and wherein the behavioural difference is determined to be subtle when a predetermined second threshold value is not exceeded and substantial when the predetermined second threshold value is exceeded.

13. The method according to claim 1, upon identifying the monitored application as malicious or suspicious, the method further comprises handling the monitored application by one or more of: terminating a process of the monitored application, terminating the characteristic action or an action resulting from the characteristic action, removing or otherwise making safe the monitored application and performing a further malware scan on the monitored application.

14. The method according to claim 1, upon identifying the monitored application as malicious or suspicious, further comprising at least one of:

sending from a client computer to a server details of the characteristic action and other actions taken on the client computer;

sending from the server to client computer an indication as to whether or not the monitored application is malicious or suspicious; sending from the server to the client computer instructions for handling the monitored application;

prompting the client computer to kill and/or remove the monitored application; or storing information indicating the monitored application.

15. A computer system comprising:
a memory configured to store computer program code, and
a processor configured to read and execute computer program code stored in the memory,
wherein the processor is configured to cause the computer system to perform:
a) monitoring installation and operation of multiple different versions of an application in the computer system;
b) analysing the multiple different versions of the monitored application
c) to generate behavioral data that is descriptive of evolutionary changes between the behaviours of the multiple different versions of the monitored application;

d) detecting and monitoring a new version of the application in the computer system;
e) monitoring behavior of the computer system to detect one or more procedures of the new version of the monitored application that do not match expected behaviors of the new version of the monitored application on a basis of the behavioural data generated via said the analysis; and
f) upon detection of the one or more procedures not matching the expected behaviors of the monitored application, identifying the monitored application as malicious or suspicious.

16. The system according to claim 15, wherein the processor is further configured to cause system to perform: analysing evolutionary changes of the behaviours of subsequent versions of the monitored application when analysing evolutionary changes of the behaviours.

17. The system according to claim 15, wherein the processor is further configured to cause the system to perform: creating and storing representations of expected behaviors of the new version of the monitored application on the basis of the analysis and to cause the system to perform the step of detecting one or more procedures that do not match the expected behaviours of the new version of the monitored application by comparing the behaviour of the new version of the monitored application to the stored representations of expected behaviours.

18. The system according to claim 15, wherein the processor is further configured to cause the system to perform: generating behavioural data for the analysis by executing the multiple different versions of the monitored application on physical machines during normal usage, on separate test machines or by a virtualization system.

19. The system according to claim 15, wherein identifying the new version of monitored application as malicious or suspicious is further based on the difference in version numbers of the multiple different versions of the monitored application, wherein the expected amount of change in behaviour is related to the amount of change in version numbers.

20. The system according to claim 15, wherein identifying the new version of monitored application as malicious or suspicious further comprises the processor causing the system to perform:
   determining which already analysed version of the same application is most similar with the new version of the same application by comparing the codes of the multiple different versions of the same application with the new version of the same application;
   determining a version delta value between a most similar version and the new version on a basis of the comparison comprising at least one of;
   identifying the new version of the monitored application as suspicious or malicious, if the version delta value is subtle and a behavioural difference is substantial;
   identifying the new version of the monitored application as unknown, if the version delta value is substantial and the behavioural difference is substantial; or
   identifying the new version of the monitored application as normal, if both the version delta value and the behavioural difference is subtle or the version delta value is substantial and the behavioural difference is subtle.

21. A non-transitory computer storage medium having stored thereon computer program code for implementing the method of claim 1.

* * * * *